: US 7,483,035 B2
(45) Date of Patent: Jan. 27, 2009

(12) United States Patent
Xu (54) TEXTURE CACHE CONTROL USING A DATA DEPENDENT SLOT SELECTION SCHEME (75) Inventor: Jianming Xu, San Jose, CA (US)

(73) Assignee: Via Technologies, Inc., Taipei (TW)

( * ) Notice: Subject to any disclaimer, the term of this patent is extended or adjusted under 35 U.S.C. 154(b) by 475 days.

(21) Appl. No.: 11/176,461

(22) Filed: Jul. 7, 2005

(65) Prior Publication Data
US 2007/0008330 A1    Jan. 11, 2007

(51) Int. Cl.
G09G 5/00 (2006.01)
G09G 5/36 (2006.01)
G06T 51/20 (2006.01)
G06T 1/60 (2006.01)
G06F 1/20 (2006.01)

(52) U.S. Cl. .................... 345/582; 345/557; 345/552; 345/538; 345/565; 382/305; 711/118; 711/130

(58) Field of Classification Search ......... 345/418–419, 345/581–582, 587, 536–538, 541–543, 549, 345/552, 556–557, 428, 583, 501, 561–565; 382/285, 305; 711/3, 100, 111, 147, 118–123, 711/129–130, 131–133
See application file for complete search history.

(56) References Cited

U.S. PATENT DOCUMENTS

| 6,104,445 | A  | * | 8/2000  | Kim ........................... 348/836 |
| 6,363,747 | B1 | * | 4/2002  | Budinski et al. ............... 65/26 |
| 6,545,686 | B1 | * | 4/2003  | Fadden ....................... 345/582 |
| 6,801,207 | B1 | * | 10/2004 | Tischler et al. .............. 345/557 |
| 6,862,027 | B2 | * | 3/2005  | Andrews et al. ............ 345/505 |
| 6,924,811 | B1 | * | 8/2005  | Minkin ....................... 345/552 |
| 7,027,063 | B1 | * | 4/2006  | Minkin ....................... 345/552 |
| 7,136,068 | B1 | * | 11/2006 | Priem et al. ................. 345/503 |
| 7,417,639 | B2 | * | 8/2008  | Nishi .......................... 345/552 |
| 2004/0015659 | A1 | * | 1/2004  | Dawson ...................... 711/129 |
| 2005/0179693 | A1 | * | 8/2005  | Fu et al. ..................... 345/557 |
| 2005/0231519 | A1 | * | 10/2005 | Solanki et al. .............. 345/552 |
| 2006/0250408 | A1 | * | 11/2006 | Xu ............................. 345/582 |

* cited by examiner

*Primary Examiner*—Wesner Sajous
(74) *Attorney, Agent, or Firm*—Thomas, Kayden, Horstemeyer & Risley (57) ABSTRACT

Provided are methods, systems, and graphics processing apparatus, for improving graphics system performance using a data dependent slot and set selection technique for receiving texture data into an L2 cache for providing a high utilization of system resources in a diverse texture processing environment.

27 Claims, 12 Drawing Sheets

| SPECIFIC BIT DETERMINATION LOGIC FOR SET ADDRESS 1400 | | |
|---|---|---|
| TEXTURE RESOLUTION 1410 | DIMENSIONAL PROPERTY 1420 | |
| | 2D DATA FIELD BITS 1422 | 3D DATA FIELD BITS 1424 |
| 4 BPE | 4&4 | 1&0 |
| 8 BPE | 3&4 | 1&0 |
| 16 BPE | 3&3 | 1&0 |
| 32 BPE | 2&3 | 1&0 |

| SPECIFIC BIT DETERMINATION LOGIC FOR SLOT ADDRESS 1500 | | | | | | | | |
|---|---|---|---|---|---|---|---|---|
| DIMENSIONAL PROPERTY 1510 | TEXTURE RESOLUTION 1520 | DATA FIELD COMBINATION 1530 | | | | | | |
| | 2D | VU | TT | TU | TV | DT | DV | DU |
| 2D | 4 BPE | 5&5 | 1&0 | *** | 0&5 | 0&0 | 0&5 | *** |
| | 8 BPE | 4&5 | 1&0 | 0&5 | *** | 0&0 | *** | 0&5 |
| | 16 BPE | 4&4 | 1&0 | *** | 0&4 | 0&0 | 0&4 | *** |
| 1512 | 32 BPE | 3&4 | 1&0 | 0&4 | *** | 0&0 | *** | 0&4 |
| | 3D | UQ | VQ | TQ | DT | DQ | TT | |
| 3D | 4 BPE | 4&2 | *** | 0&2 | 0&0 | 0&2 | 1&0 | |
| | 8 BPE | *** | 3&2 | 0&2 | 0&0 | 0&2 | 1&0 | |
| | 16 BPE | 3&2 | *** | 0&2 | 0&0 | 0&2 | 1&0 | |
| 1514 | 32 BPE | *** | 2&2 | 0&1 | 0&0 | 0&1 | 1&0 | |

TEXTURE CACHE CONTROL USING A DATA DEPENDENT SLOT SELECTION SCHEME

TECHNICAL FIELD

The present disclosure is generally related to texture caches, and, more particularly, is related to texture cache control using a data dependent slot selection scheme for loading a cache.

BACKGROUND

As is known, computer graphics processing systems process large amounts of data, including texture, among others. A texture is a digital image, often rectangular in shape, having a (U,V) coordinate space. The smallest addressable unit of a texture is a texel, which is assigned a specific (U,V) coordinate based on its location. In a texture mapping operation, a texture is mapped to the surface of a graphical model as the model is rendered to create a destination image. In the destination image, pixels are located at specific coordinates in the XY coordinate system.

Texture data often resides in system memory, which is a shared resource. In many computer systems, other devices may attempt to access data used by the graphics processing system or utilize a shared system bus, both of which may result in increased data access time for the graphics processing system. Additionally, requests for data from system memory may take excessive amounts of time for other reasons. Accordingly, accessing system memory may have a performance inhibiting effect on graphics processing systems.

One technique for improving data accessibility is through a graphics cache that is dedicated to storing graphics data. The graphics cache is provided graphics data from the system memory before the data is required for graphics processing, thereby providing the graphics system with the graphics data and reducing the requirement to access system memory. This, in turn, reduces problems associated with memory latency.

A graphics cache, however, generally lacks the capacity to store the entire texture map. A graphics cache sufficient to store an entire texture map would likely suffer from reduced performance because cache access time generally increases as the cache size increases. Further, an increased cache size requires more chip resources, which are often already at a premium.

One common approach to increasing cache size without significantly degrading cache performance is to provide two-level caches. The first level in a two-level cache is provided for the data that is most likely to be immediately required, whereas the second level stores data more likely to be used in the near future. A two-level cache provides benefits in terms of increased cache size without a significant decrease in cache performance by providing benefits in terms of increased data availability and decreased memory access time. The use of a two-level cache does create issues regarding the selection and transfer of the data to the cache system, as well as the deletion of data from the cache system. Thus, without an appropriate determination of which data to request, transfer, and delete, however, the benefits of a two-level cache system may be reduced.

In other words, an efficient technique must be established for allocating cache spatial and temporal resources, such that the texture data required for processing by, for example, a texture filter, is available and complete in the cache system. For instance, texture data is received from system memory in a multitude of different formats and sizes. Failure to consider the size or configuration of the data results in inefficient use of the cache system resources. One source of inefficiency occurs when the logic for loading data into a cache is not optimized for the size or configuration of the data, which results in the overwriting or trashing of valid data. Determining an efficient technique for allocating the locations for incoming data will address the need for fast processing of graphics data in a computer graphics environment.

Thus, a heretofore-unaddressed need exists in the industry to address the aforementioned deficiencies and inadequacies.

SUMMARY

Embodiments of the present disclosure may be viewed as providing a method for processing texture data in a graphics processor, comprising the steps of: storing texture data in a memory; reading a plurality of first texture attributes from the texture data; analyzing the plurality of first texture attributes; determining a plurality of first data fields for selecting a source of cache slot address data, such that the plurality of first data fields depends on the plurality of first texture attributes; reading a plurality of second texture attributes from the texture data; analyzing the plurality of second texture attributes; and determining a plurality of second data fields for selecting a source of cache set address data, such that the plurality of second data fields depends on the plurality of second texture attributes.

Briefly described, in architecture, one embodiment, among others, can be implemented as a graphics processing system, comprising: a cache that receives texture data from a system memory, such that the texture data is assigned a specific cache location; a plurality of attributes in the texture data; selection logic configured to determine a plurality of data fields from the plurality of attributes; a plurality of texture values in the plurality of data fields, such that the plurality of texture values are utilized to determine the specific cache location.

An embodiment of the present disclosure can also be viewed as providing a graphics processing apparatus, comprising: a means for receiving texture data, such that the texture data is temporarily stored for processing in a texture filter; a means for analyzing a plurality of texture attributes to determine which of the plurality of texture attributes will establish a texture data receiving address; and a means for determining which bit in each of the plurality of texture attributes will establish a texture data receiving address.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Having summarized various aspects of the present disclosure, reference will now be made in detail to the description of the disclosure as illustrated in the drawings. While the disclosure will be described in connection with these drawings, there is no intent to limit it to the embodiment or embodiments disclosed therein. On the contrary, the intent is to cover all alternatives, modifications and equivalents included within the spirit and scope of the disclosure as defined by the appended claims.

As will be described further herein, there are several locations in a graphics system where features or aspects of the disclosure may be implemented. Likewise, it will be appreciated from the description herein that there are systems and environments in fields other than computer graphics where the concepts of the disclosure may be employed.

Presented are efficient techniques for utilizing cache spatial and temporal resources in an environment where texture data occurs in multiple formats and sizes. The allocation is optimized based on the size and configuration of the data through an improved texture cache control that includes a unique slot selection method for organizing the data inside the cache.

Figure 1:
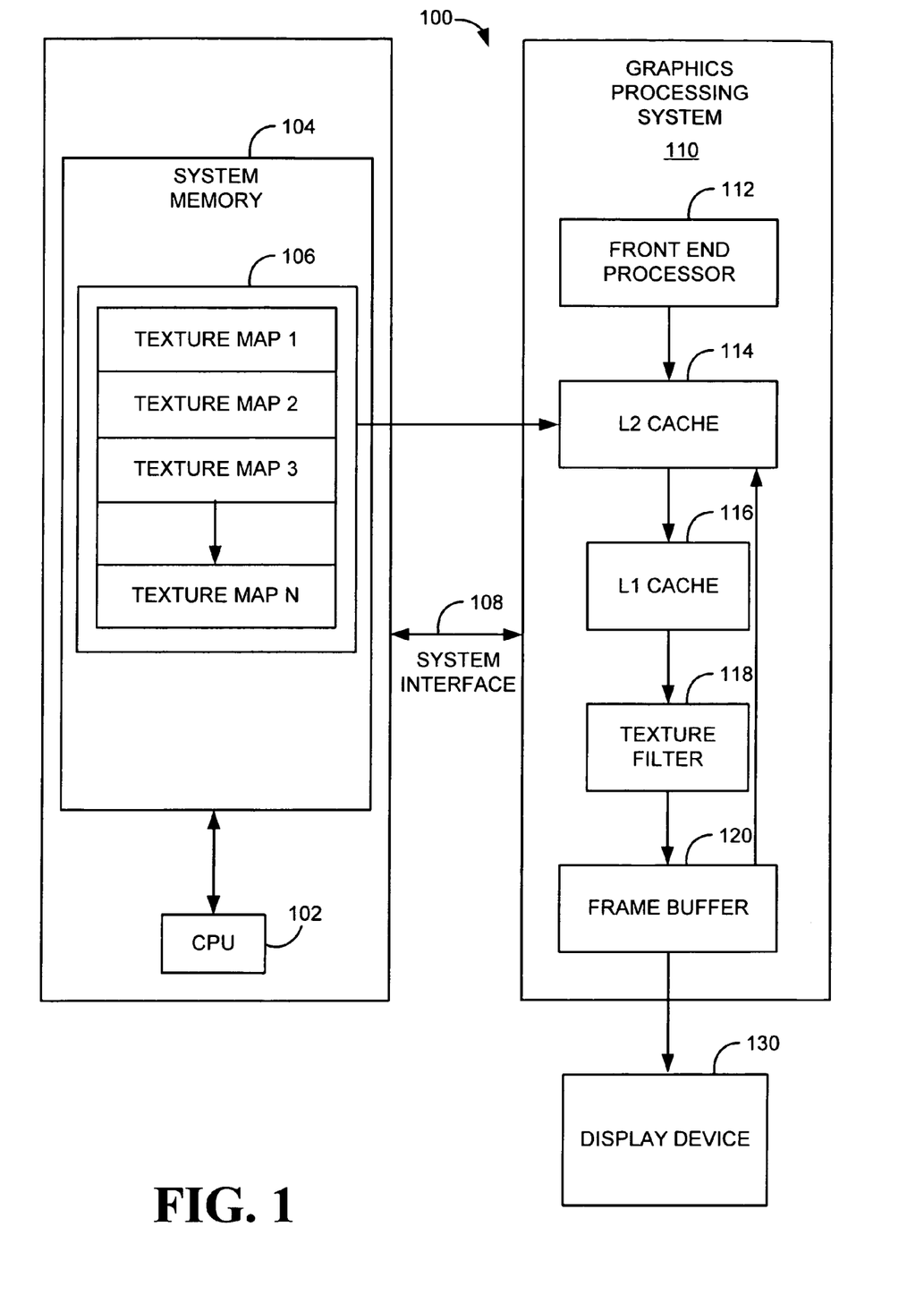
FIG. 1 illustrates a simplified block diagram of a computer system.

Reference is made to FIG. 1, which illustrates a simplified block diagram of a computer system 100. The computer system 100 includes a CPU 102, a system memory 104 and a graphics processing system 110. The CPU 102 performs various functions, including determining information, such as a viewpoint location, allowing for the generation of graphic displays. The system memory 104 stores a variety of data, including graphic display data such as texture maps 106. The graphics processing system 110, based on information determined by the CPU 102 and data stored in the system memory 104, generates display data for a display device 130, such as, for example, a monitor.

The CPU 102 provides requests to the graphics processing system 110 over a system interface 108. These requests include requests to process and display graphics information. Graphics requests from the CPU 102 are received by the graphics processing system 110 and provided to a front end processor 112. The front end processor 112 generates a pixel stream containing pixel coordinates for the display device 130.

Information relating to the pixel coordinates generated by the front end processor 112 is provided to a texture filter 118. The texture filter 118 filters the information performing, for example, bilinear filtering, trilinear filtering, or a combination thereof, and generates texture data for each pixel. The texture data is a component of the final color data that is sent to a frame buffer 120, which is used to generate a display data for a display device 130.

The graphics processing system 110 includes multiple caches. The caches include a level 1 ("L1") cache 116 and a level 2 ("L2") cache 114. The L1 and the L2 caches store portions of texture maps 106 used during graphics processing. The texture maps 106 contain texture information for geometric objects. The texture information is stored as individual texture elements (texels). The texels are used during graphics processing to define color data displayed at pixel coordinates. The texture data generally flows from the system memory 104 to the L2 cache 114, then from the L2 cache 114 to the L1 cache 116.

Figure 2:
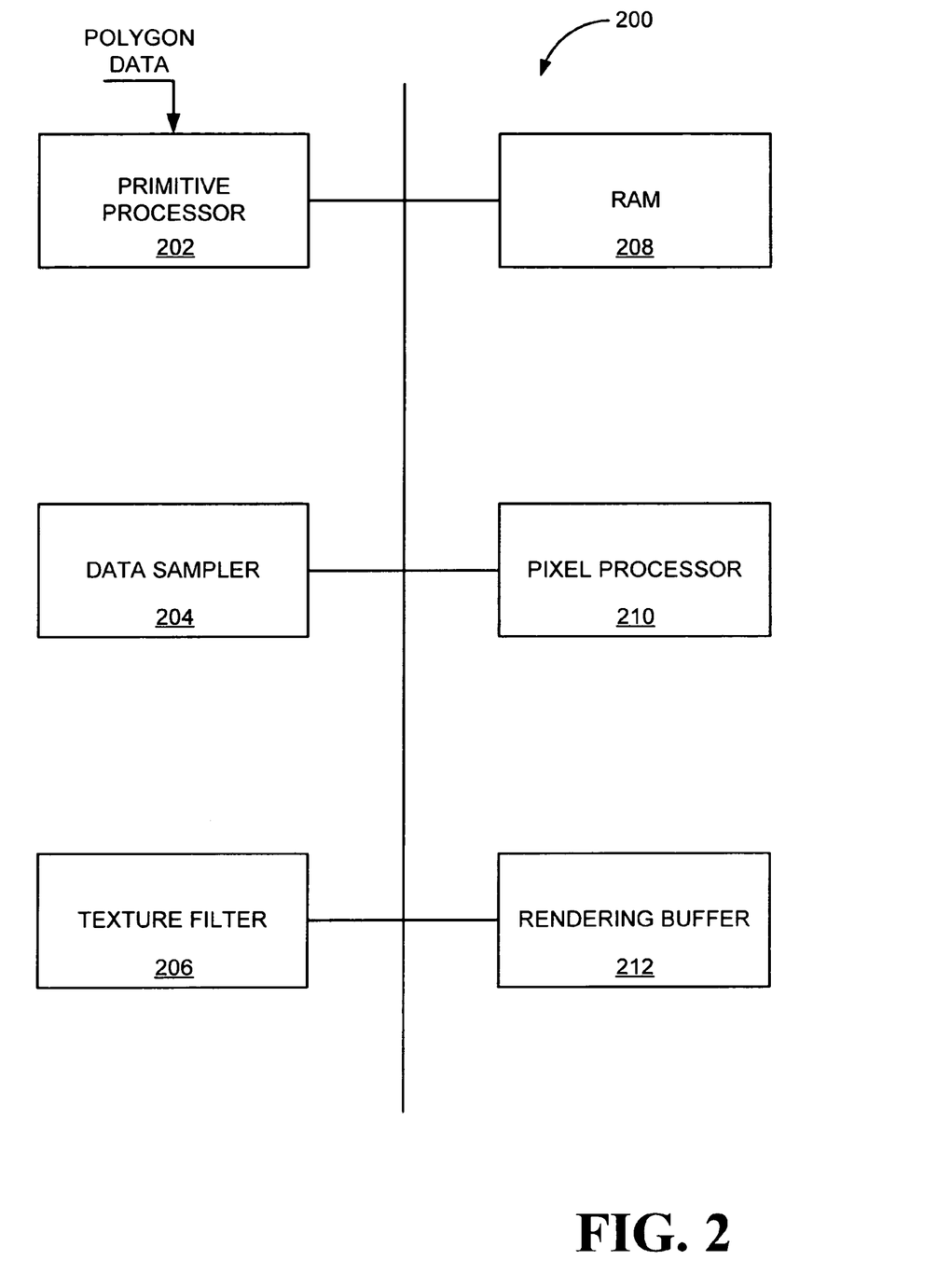
FIG. 2 is a block diagram illustrating an exemplary system for performing texture filtering operations.

Having described the structural components of a computer system as utilized for performing the systems, methods, and apparatus disclosed herein, reference is now made to FIG. 2, which is a block diagram illustrating an exemplary system 200 for performing texture filtering operations of the present disclosure. In contrast with the computer system of FIG. 1, the system of FIG. 2 is illustrated in terms of logical function blocks. The system 200 is typically implemented in a graphics processing system within a computer or similar processing device. The system 200 includes a primitive processor 202, a data sampler 204, a texture filter 206, RAM 208 for storing textures, a pixel processor 210, and a rendering buffer 212.

Relating to FIG. 1, some or all of the functions performed by the primitive processor 202 and the pixel processor 210 can performed totally or partially by the front end processor 112 of FIG. 1. Similarly, some or all of the functions performed by the data sampler 204 can be performed through combined operation of the front end processor 112, the L2 cache 114, the L1 cache 116, or some combination thereof. Further, some or all of the functions of the rendering buffer 212 can be performed in the frame buffer 120. The storage function of the RAM 208 can be performed in the system memory 104 and the texture filter 206 corresponds to the texture filter 118. The above-discussed correlations between components in FIG. 1 and FIG. 2 are provided to further improve the understanding of the subject matter sought to be patented and is not intended to limit the scope or spirit of the disclosure in any way.

The primitive processor 202, which may be a triangle processor, typically receives the three-dimensional ("3D") geometry elements (e.g., triangles or other graphic primitives) and processes the data describing the size, shape, position, and other relative characteristics of the graphics primitives. In some cases, the primitive processor 202 is also capable of generating edge functions of the primitives. These primitives may be defined in 3D using Euclidean coordinates or in four-dimensions ("4D") using homogenous coordinates, and subsequently, projected onto a two-dimensional ("2D") plane by a known algorithm.

The data sampler 204 selects a finite set of values from the polygon data received by the primitive processor 202. The sampling of the polygon data may occur at different resolutions. For example, interior portions of a polygon may be sampled at a rate, which is required to generate the destination screen resolution, while the detected edges of a polygon may be super-sampled at a higher resolution.

The texture filter 206 performs one of the filtering techniques (e.g., bilinear filtering, trilinear filtering, box filtering, and/or a combination thereof) to calculate the color value (or other attribute) of a new texel, which is then assigned to a particular pixel. The texture filter 206 may generate the filtered textured pixel values based on data received from the RAM 208. Additionally, the texture filter 206 may be used in various types of applications such as rendering multi-rate data samples (polygon data sampling at different resolutions).

The pixel processor 210 performs rendering operations. The rendering operations may be altered in a selected manner to generate various effects such as simulated light sources and shadows. Finally, the rendering buffer 212 stores images, which may be displayed in a display device or used to render another image.

Figure 3:
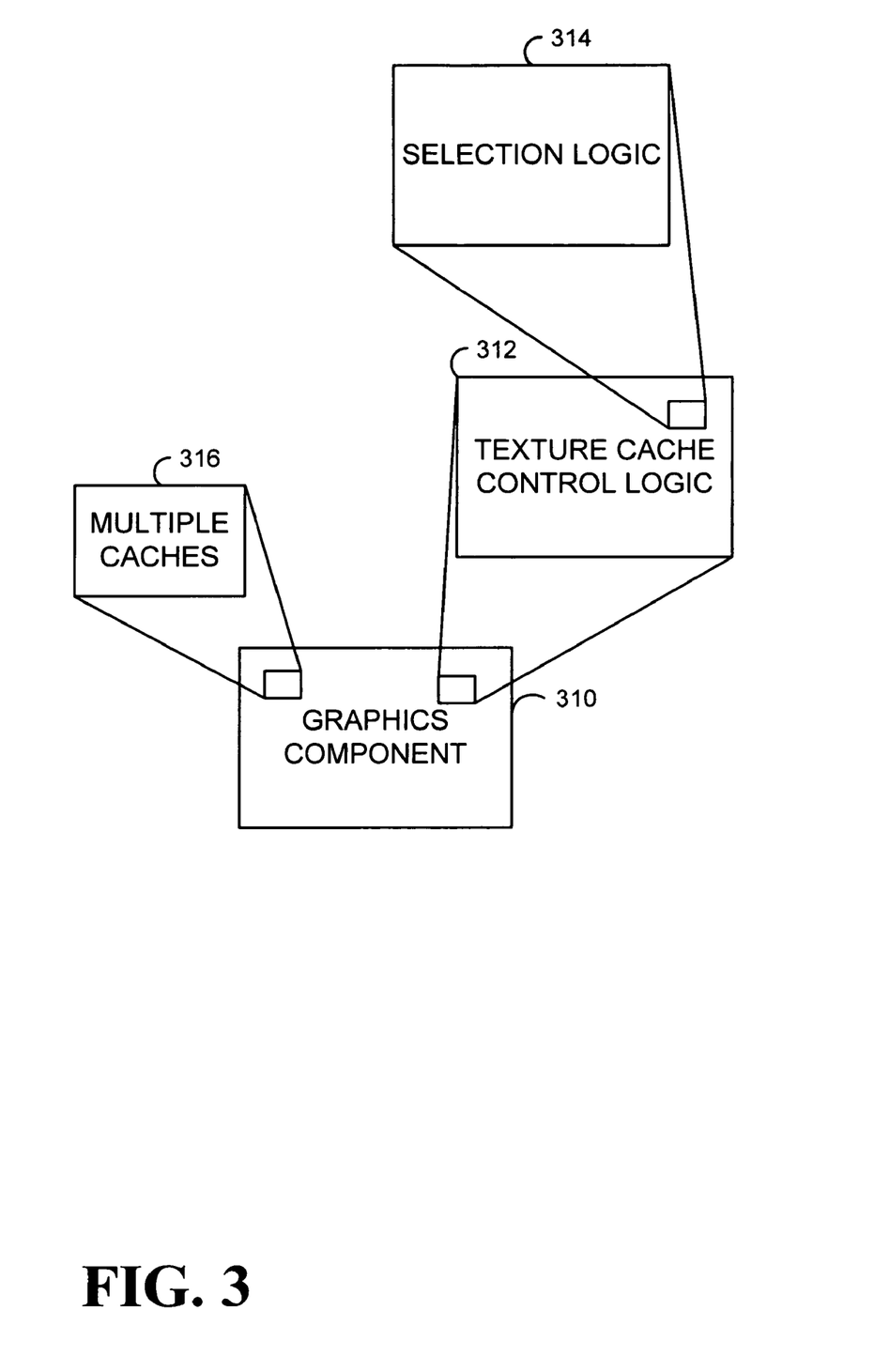
FIG. 3 illustrates certain basic components of an embodiment disclosed herein.

Reference is made briefly to FIG. 3, which illustrates certain basic components of an embodiment of the disclosure. FIG. 3 includes a component labeled "Graphics Component" 310, which may designate or represent hardware components in a graphics pipeline. Within this component, logic 312 may be provided for texture cache control, which provides data and cache control functions corresponding to multiple caches 316, also within the graphics component. The texture cache control logic 312, the selection logic 314, and the multiple caches 316 can, in some non-limiting embodiments, correspond to the functions described in reference to the data sampler 204, of FIG. 2. As discussed below, the multiple caches 316 can include L1 and L2, also discussed above in reference to FIG. 1. The texture cache control logic 312 includes selection logic 314 for determining a slot selection scheme that adapts to the format and type of data being loaded into L1.

Figure 4:
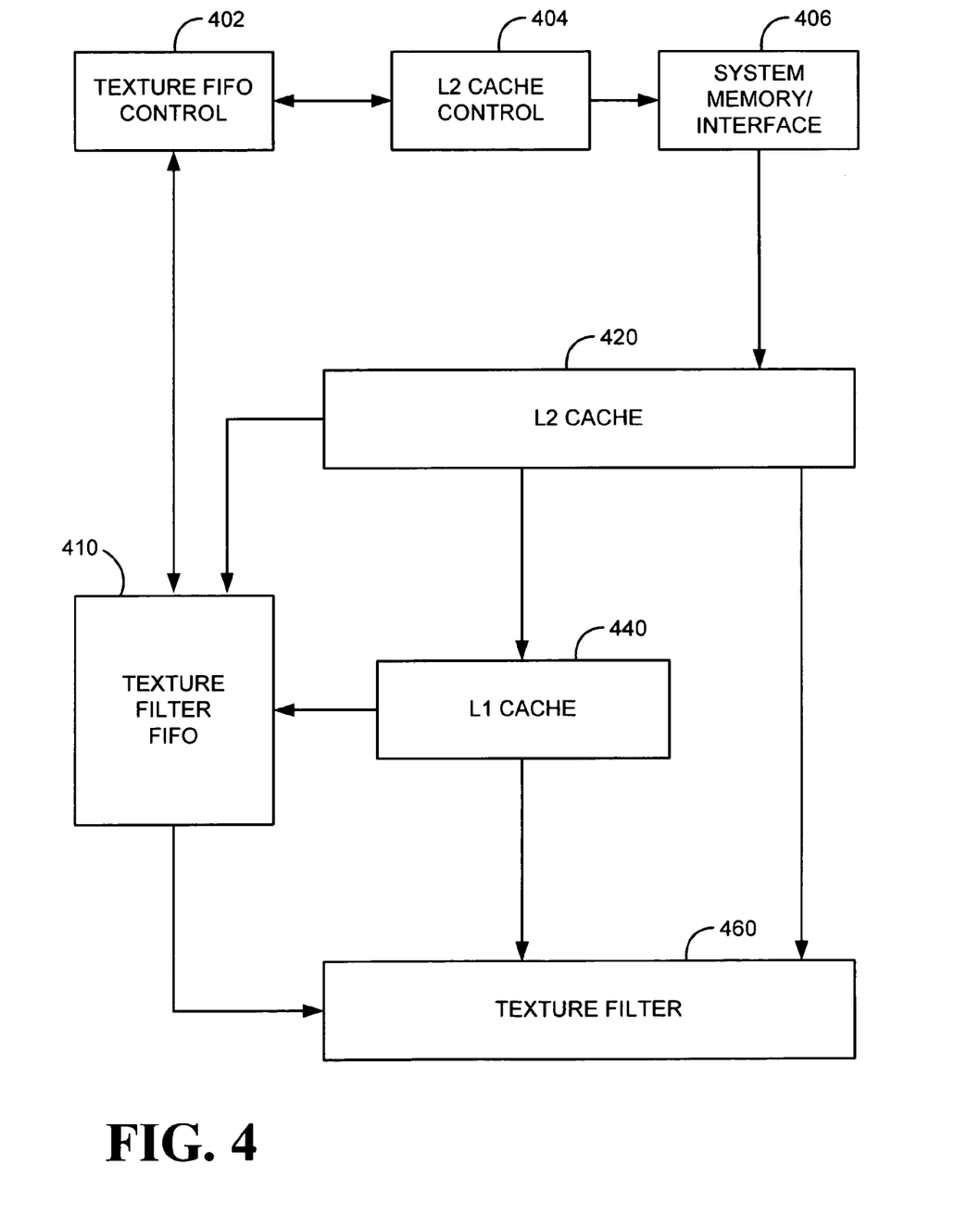
FIG. 4 is a block diagram illustrating an exemplary arrangement of logical components configured to process texture data.

Reference is now made to FIG. 4, which is a block diagram illustrating an exemplary arrangement of logical components configured to process texture data using the techniques disclosed herein. The arrangement of FIG. 4 provides a non-limiting example of greater level of abstraction of portions of the systems and components as illustrated in FIGS. 1, 2 and 3. For example, the system memory/memory interface 406, the L2 cache 420, the L1 cache 440, and the texture filter 460, can correspond in a non-limiting way to similar structures of FIG. 1. Similarly, the L2 cache control 404, the texture filter FIFO 410, and the texture FIFO control 402, can correspond to, for example, the data sampler 204 of FIG. 2, the texture cache control logic 312 of FIG. 3, or some combination thereof.

The system memory/memory interface 406 serves to provide the texture filter system with texture data stored in texture maps. This texture data, when requested, may be provided in the form of texture address data to L2 420. Although the texture address data may be in the form of physical address data, some embodiments utilize logical address data, which will later be resolved into physical address data. The system memory/memory interface 406 receive data requests from the L2 cache control 404, which, in some embodiments, receives information regarding required texture data from the texture FIFO control 402. The texture FIFO control 402 communicates with the texture filter FIFO 410, which operates to compensate for the missing texture data access latency between the system memory 406 and L2 420. The texture FIFO control 402 can provide for coordination with the L2 cache control 404 to verify the status of requested texture data.

Data stored in L1 440 is available for subsequent communication to the texture filter 460. Additionally, where a portion of the data necessary to complete a filter operation resides in both L1 440 and L2 420, the texture filter 460 may also receive texture data from L2 420.

Figure 5:
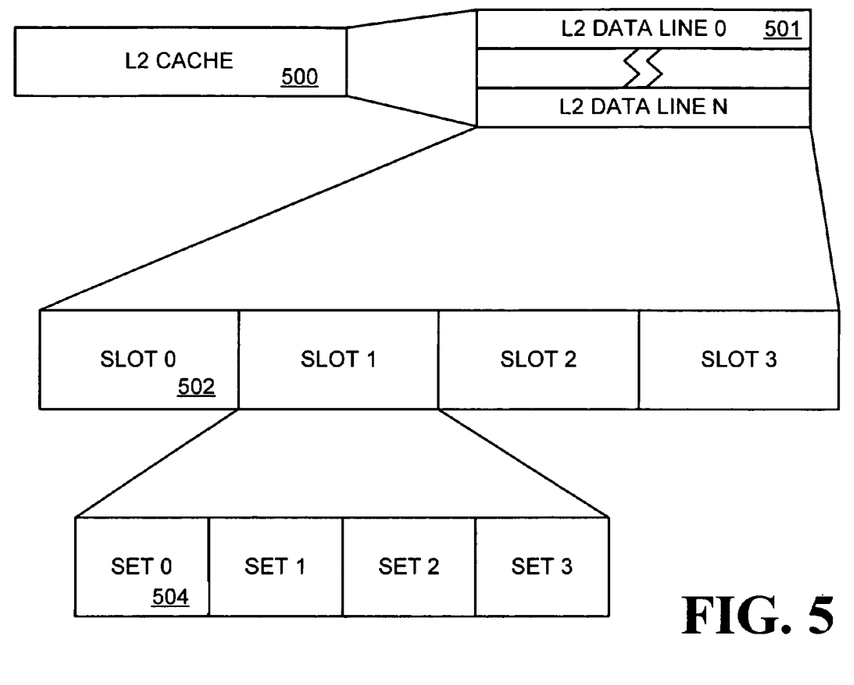
FIG. 5 is a block diagram illustrating an exemplary L2 cache-organizational format.

Reference is now made to FIG. 5, which is a block diagram illustrating an organizational format of an exemplary L2 cache, as discussed above regarding FIGS. 1 and 4 specifically and FIGS. 2 and 3 generally. Each L2 data line 501 of an exemplary embodiment of L2 500 is divided into slots 502. The slots 502 are further subdivided into sets 504. The sets 504 within the slots 502 provide set and slot address locations within L2, which determine where the received data is stored in L2. Although, as shown, L2 includes four slots and each slot contains four sets, one of ordinary skill in the art knows or will know that a cache that includes more or less than four slots and sets is within the scope and spirit of this disclosure. Additionally, as illustrated in FIG. 5, L2 500 is configured as multiple L2 data lines 501 including, for example, 64, 128, 256, or 512 data lines, among others. Further, each L2 data line 501 may be 128, 256, 512, 1024, or 2048 bits wide, among others.

Figure 6:
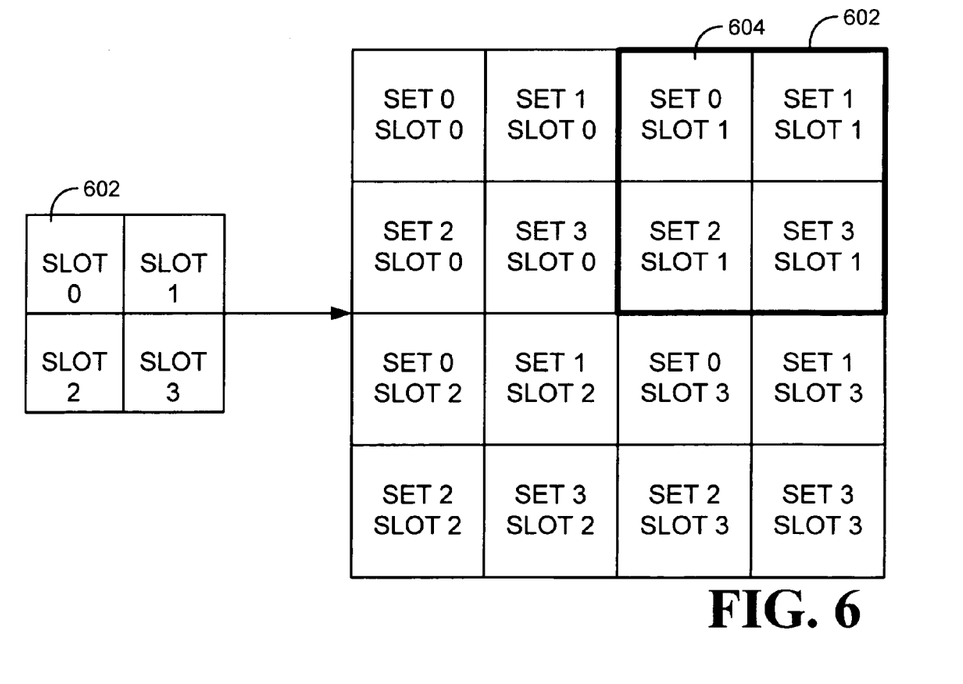
FIG. 6 is a block diagram illustrating an alternate view of an exemplary L2 organizational format.

Reference is now made to FIG. 6, which is a block diagram illustrating an alternate view of an exemplary L2 organizational format. As discussed in reference to FIG. 5, the data from an L2 data line contains four slots 602, numbered, by way of example, slot 0-slot 3. Each slot 602 is further subdivided into four sets 604, numbered 0 through 3. The actual physical arrangement of L2, although shown arranged in a square, may not be square, and indeed is unlikely to be so arranged. The use of a square for descriptive purposes however is useful in understanding the arrangement of data in L2. Generally speaking, L2 contains data for a portion of a texture map, with a horizontal axis of L2 corresponding to the U direction and a vertical axis of L2 corresponding to the V direction. When a texture map portion is transferred to L2, it is loaded into the set of the slot to which it has been mapped based on mapping information contained in an L2 tag address.

Figure 7:
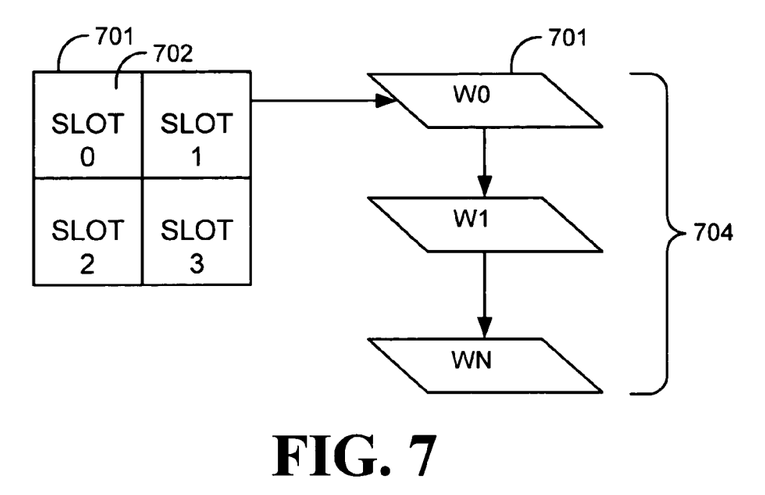
FIG. 7 is a block diagram illustrating a data structure of an exemplary L2 organizational format.

Reference is now made to FIG. 7, which is a block diagram illustrating a data structure of an exemplary L2 organizational format. Although L2, as shown in FIG. 6, is depicted as a single plane, the four slots may also be viewed as being organized into a stack-like architecture 704. In the stack-like architecture 704 each of the groups of slots 0-3 701 represents one of multiple ways $W_0$-$W_N$. The multiple ways 704 are stacked N levels deep. The order of the stacking in each set of slots depends upon an age status of the associated data. In other words, the data that is most recently used for a data transfer becomes "youngest" and goes to the bottom of the stack in the corresponding set of the corresponding slot. In the set, the least recently used, in other words "oldest" data, which occurs at the top of the stack, is overwritten first to store the received texture map portion. In that manner, the least recently used data in the set of the slot is always overwritten first.

Figure 8:
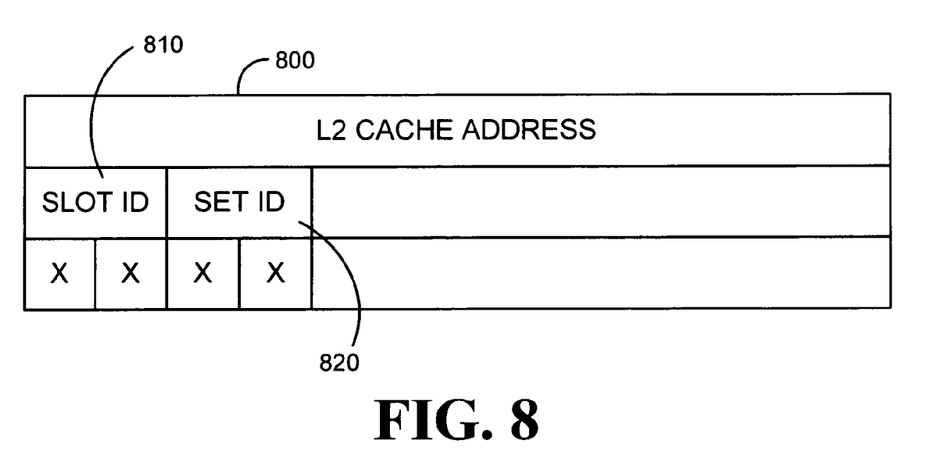
FIG. 8 is a block diagram illustrating slot and set fields in an exemplary L2 cache address.

A brief reference is now made to FIG. 8, which is a block diagram illustrating slot and set fields in an exemplary L2 cache address. The L2 cache address 800 contains, among others, fields for a slot ID 810 and a set ID 820. Consistent with the above configurations of four slots and four sets, two bits of data are necessary for each of the slot ID 810 and the set ID 820. One of ordinary skill in the art knows or will know that an L2 cache address configured to have different quantities of slots and sets may utilize identifier fields having other than two bits.

Figure 9:
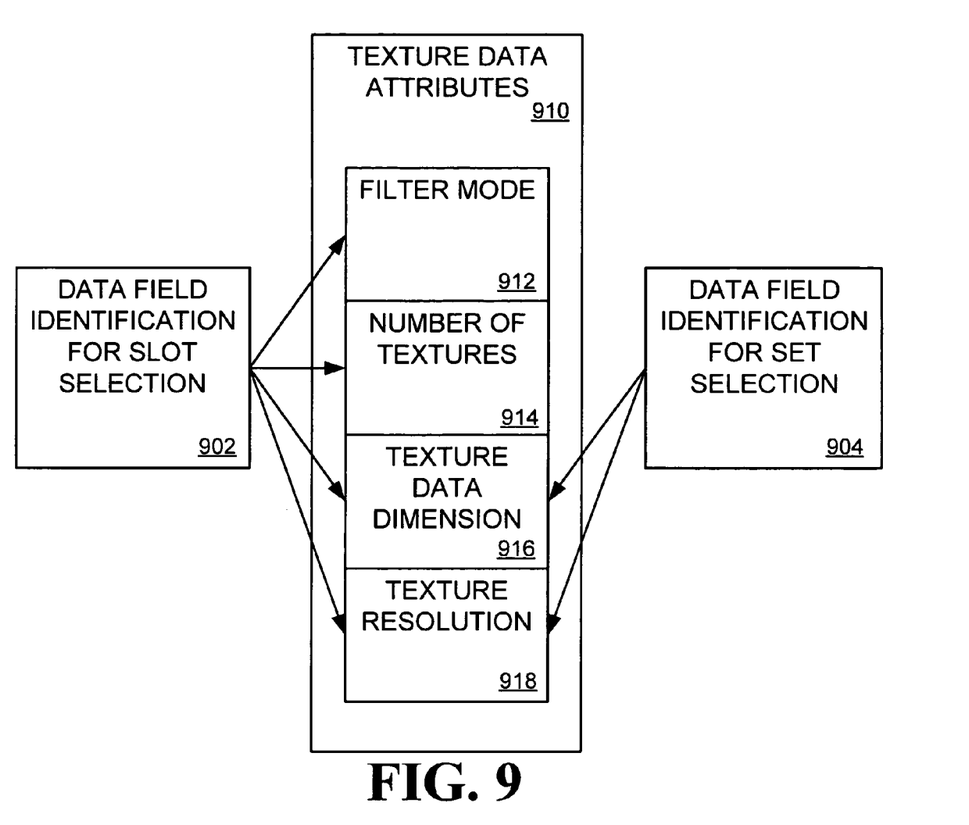
FIG. 9 is a block diagram illustrating exemplary texture data attributes utilized for selecting data fields for set and slot addresses in L2.

Reference is now made to FIG. 9, which is a block diagram illustrating exemplary texture data attributes utilized for selecting data fields for set and slot addresses in L2. The data dependent slot selection scheme disclosed herein relies on multiple texture data attributes 910 for identifying the source of slot and set address data. Exemplary texture data attributes 910 include a filter mode 912, a number of textures 914, texture data dimension 916 and the texture resolution 918. Note that several of the texture data attributes 910 relate to the texture type. The texture type is generally characterized by the filter mode 912, the texture data dimension 916, and the texture resolution 918. The filter mode 912 includes, for example, box, bilinear and trilinear filtering. The logic for selecting the slot address, however, distinguishes between trilinear filtering and non-trilinear filtering. Trilinear filtering is signaled by a mipmap enable bit, which means that the level of detail bias (D) of the texture surface is used during the cache operation.

The number of textures attribute 914 may, for example, be classified into two or more categories, including for example one texture, two textures and multiple textures. One texture means that there is only one texture surface in the whole texture request. Two textures defines the circumstance where there are two texture surfaces used at the same time. A multiple textures case occurs when there are more than two texture surfaces in the cache. The texture data dimension 916 delineates between 2D texture data and 3D texture data. The texture resolution 918 generally describes the amount of data per texture element and may range from one-bit per element, to, for example, 64-bits per element. The texture resolution 918 may, when applied to texture data, also be expressed as the number of bits per texel since a texel is a primary unit of texture data. One of ordinary skill in the art knows or will know that exemplary ranges and categories for the above-discussed texture data attributes are presented merely for example and are not intended to limit the scope of the disclosure in any way.

The data field identification for slot selection 902 of an embodiment herein, utilizes the texture data attributes 910 including filter mode 912, number of textures 914, texture data dimension 916, and texture resolution 918. The data field identification for set selection 904 uses texture data dimension 916 and texture resolution 918. Note that data field identification for set and slot address data of FIG. 9 only identifies the data fields, which serve as slot and set address data source and not the bits within the fields. Since the data block size depends on the texture data attributes 910, these can be used in the selection of the slot and set combination to create a higher L2 hit rate because the distribution of the L2 cache line is balanced and the same texture surfaces stay grouped without unnecessary overwriting.

Figure 10:
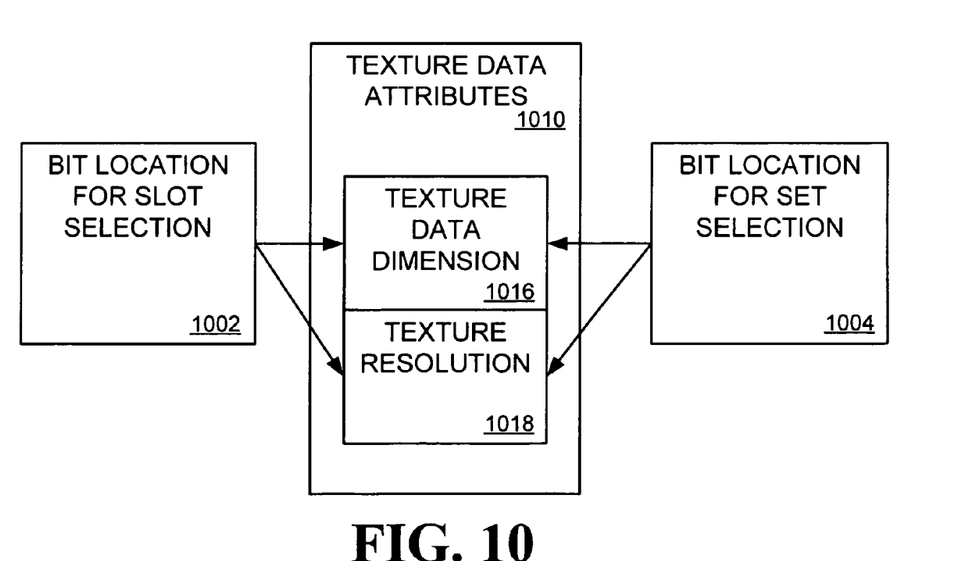
FIG. 10 is a block diagram illustrating exemplary texture data attributes utilized for selecting bit locations within the selected data fields.

Reference is now made to FIG. 10, which is a block diagram illustrating exemplary texture data attributes utilized to select bit locations within the data fields of FIG. 9. Bit location selection for slot and set address data relies on texture data attributes 1010. The texture data attributes 1010 utilized for bit location for both set and slot address data are the texture data dimension 1016 and texture resolution 1018. As shown in FIGS. 9 and 10 the data dependent slot selection utilizes texture data attributes to select both the data field and the bit within the data field to identify the location of the slot and set address data.

Figure 11:
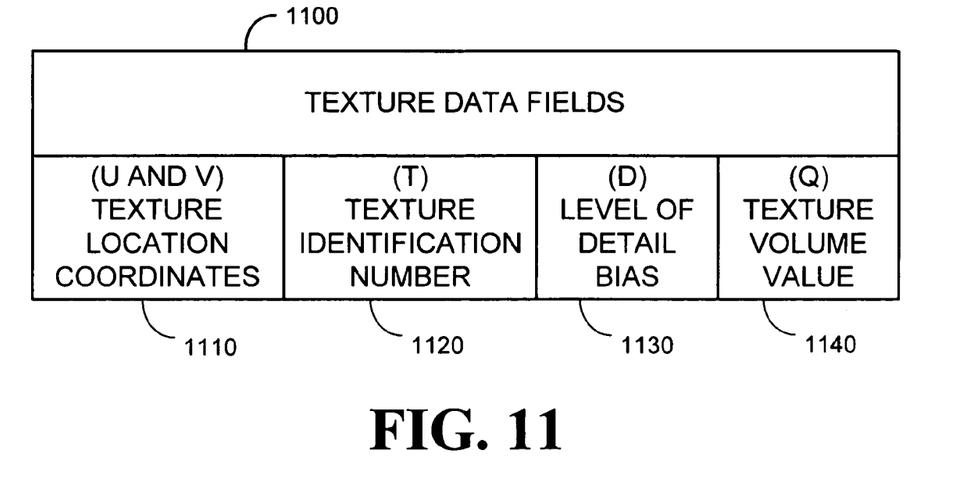
FIG. 11 is a block diagram illustrating exemplary texture data fields.

Reference is now made to FIG. 11, which is a block diagram illustrating exemplary texture data fields, as disclosed herein. The texture data includes multiple data texture data fields 1100. The texture data fields 1100 include texture location coordinates 1110, which for example include U and V values. As is known, the U and V values are texture location coordinates similar to the X and Y values used in the pixel coordinate location system. A texture identification number 1120 is also included in the texture data fields 1100. Another field included in the texture data is the level of detail bias 1130, which describes the level of detail associated with a mipmap technique. Additionally, the texture data includes a texture volume value 1140, which may be used for special effects, including but not limited to, spotlighting. As discussed in reference to FIGS. 9 and 10, one or more of the texture data fields 1100 serve as a source or sources of slot and set address data for slot selection.

Figure 12:
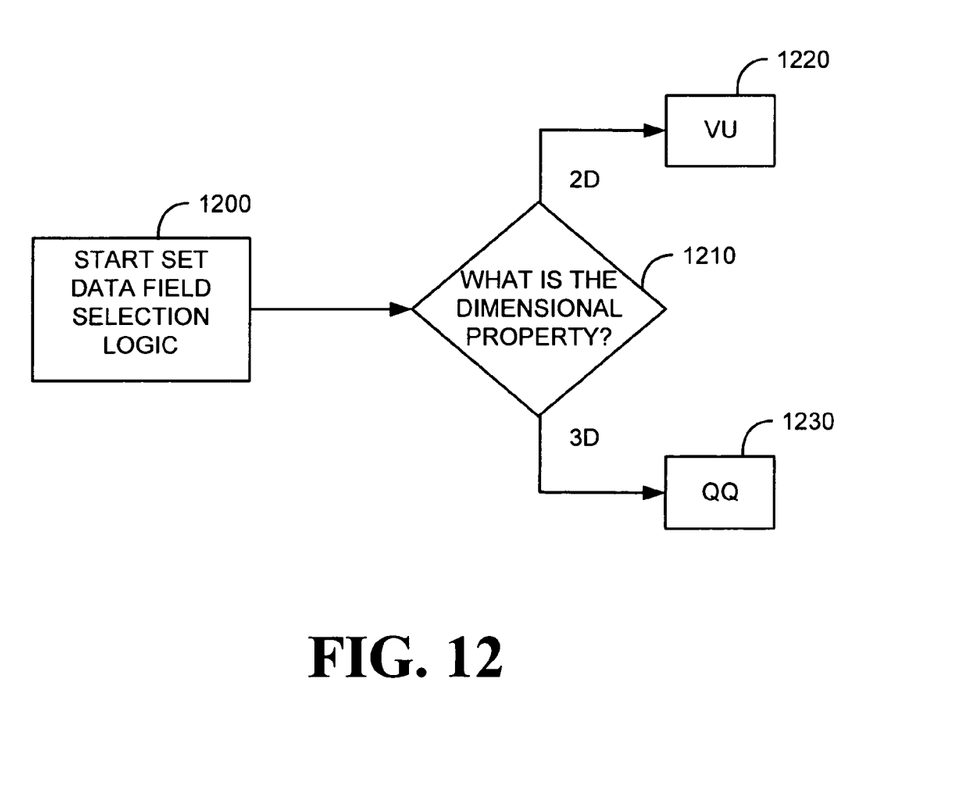
FIG. 12 is a block diagram illustrating logic for determining the data fields used for set address selection.

Reference is now made to FIG. 12, which is a block diagram illustrating logic for determining the data fields used for set address selection. The set data field selection logic 1200 first determines the dimensional property of the texture data in block 1210. If the dimensional data is 2D then the data fields for selecting the set are V and U, the texture location coordinates discussed above in reference to FIG. 11. In other words, the first bit in the set address is defined in the V data field and the second bit of the set address is defined in the U data field. In the alternative, if the dimensional property is 3D then the data field used for selecting the set is Q for both bits of the set address, as shown in block 1230.

Figure 13:
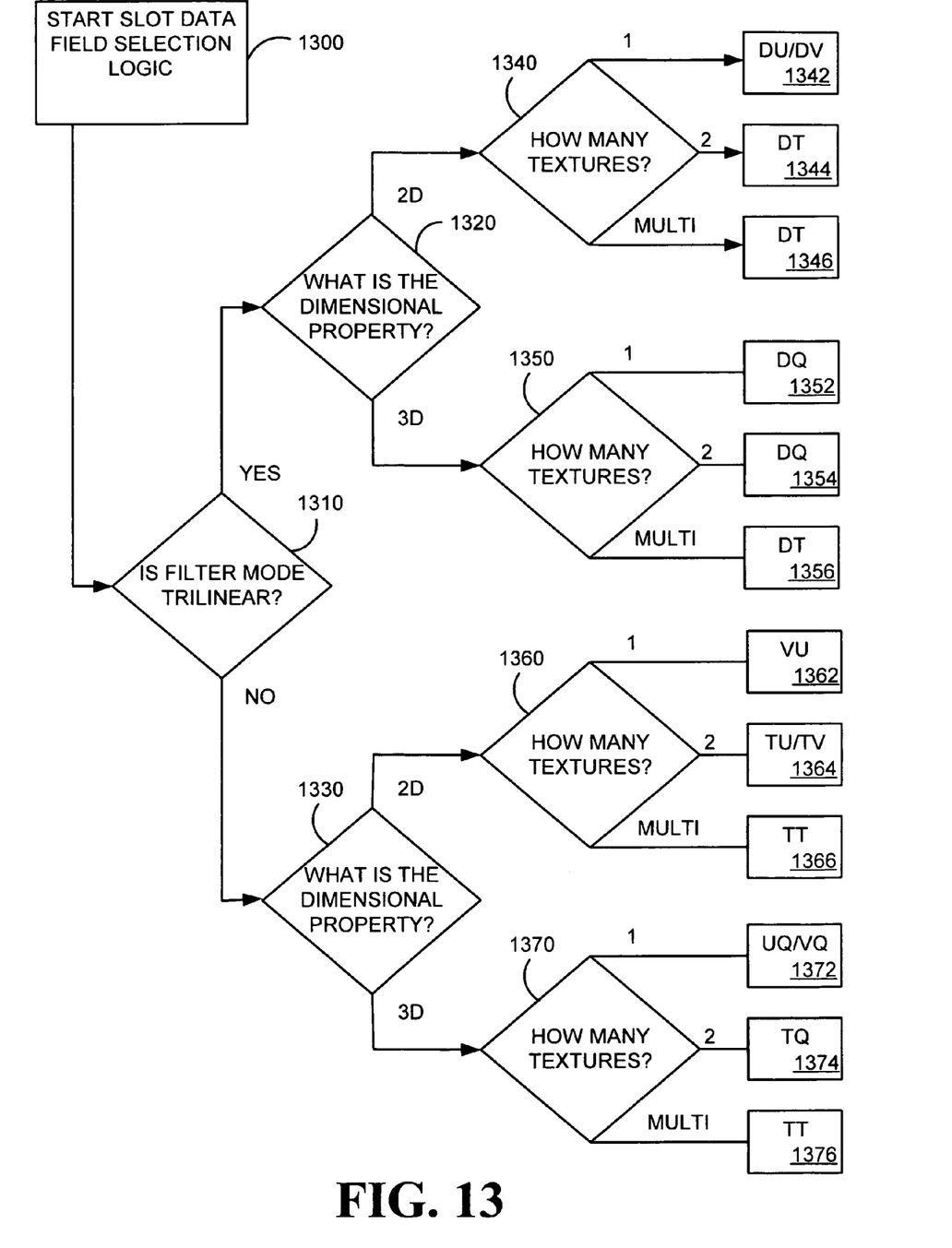
FIG. 13 is a block diagram illustrating logic for determining the data fields used for slot address selection.

Reference is now made to FIG. 13, which is a block diagram illustrating logic for determining the data fields used for slot address selection. The logic for determining the data field which serves as the source for the slot address data starts by determining whether the filter mode is trilinear in block 1310. If the filter mode is trilinear then the logic next determines the dimensional property of the texture data in block 1320. If, for example, the texture data is 2D then the logic determines how many textures are being processed in block 1340. In the case where there is a single texture, the slot address data will be determined from the values in either the D and U data fields or the D and V data fields 1342. The selection between the U and V data fields is determined by the texture resolution, as discussed below in reference to FIG. 15. In other words, the 2-bit value for determining the slot will be determined by a bit in the D data field and a bit in either the U data field or V data field. Alternatively, if the texture data contains two textures the slot address will be determined by bits in the D and T data fields 1344. In the third case, where the data has multiple textures, the slot address data will be defined by bits in the D and T data fields 1346. One of ordinary skill in the art knows or will know that the same logic applied to different texture data, for example non-linear 3D texture data having two textures, will result in different data fields for determining the slot address.

Figure 14:
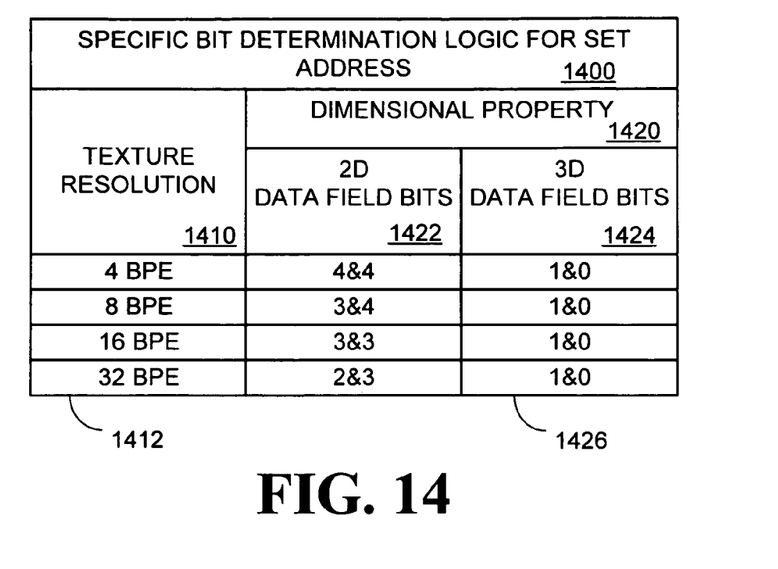
FIG. 14 is a block diagram illustrating logic for determining which bits are used within the data fields for set address selection.

Reference is now made to FIG. 14, which is a block diagram illustrating logic for determining which bits are used within the data fields for set address selection. Although the set address bit determination logic 1400 is illustrated in tabular form, one of ordinary skill in the art will appreciate that the tabular form is merely exemplary and is not intended to limit the scope and spirit of the disclosure. The set address bit determination logic 1400 utilizes the combination of texture resolution 1410 and dimensional property 1420. As discussed previously, dimensional property includes 2D texture data and 3D texture data. The 2D data field bits 1422 and the 3D data fields bits 1424 are each shown to vary as the texture resolution 1410 changes. For example, 3D texture data having a resolution of 32-bits per element 1412 will determine set address data from bits 1 and 0 as shown in block 1426. One of ordinary skill in the art knows or will know that the actual texture resolution values and the specific data field bits are merely exemplary and are not intended to limit the scope of this disclosure in any way.

Figure 15:
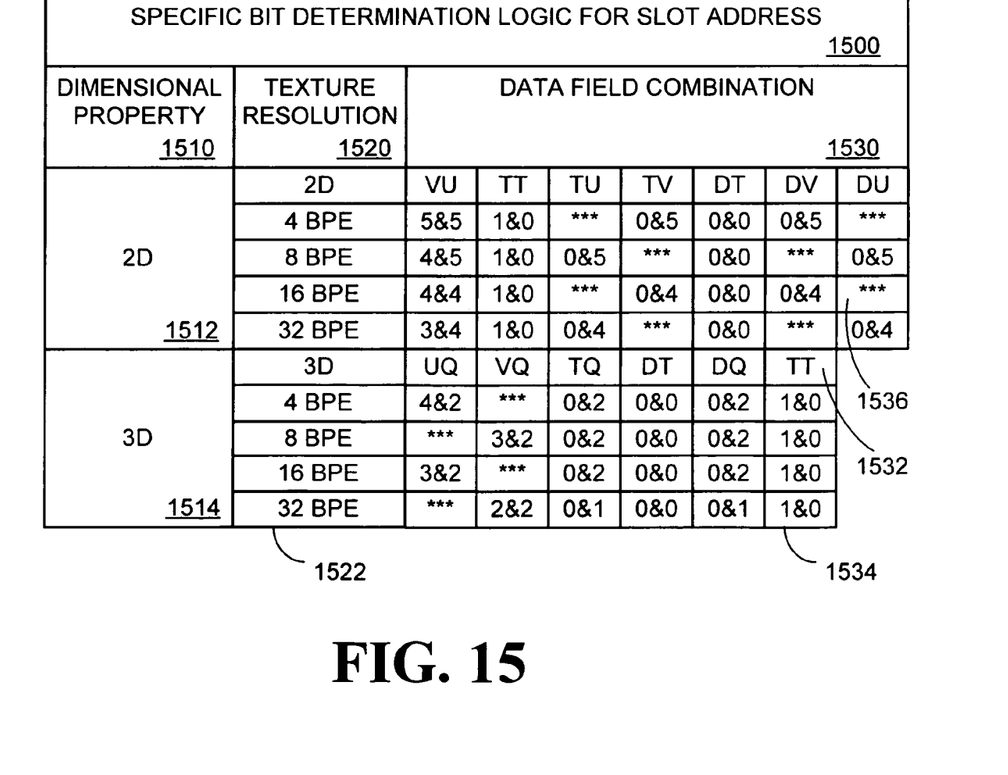
FIG. 15 is a block diagram illustrating logic for determining which bits are used within the data fields for slot address selection.

Reference is now made to FIG. 15, which is a block diagram illustrating logic for determining which bits are used within the data fields for slot address selection. Although the slot address bit determination logic 1500 is illustrated in tabular form, one of ordinary skill in the art will appreciate that the tabular form is merely exemplary and is not intended to limit the scope and spirit of the disclosure. The logic for determining which bits within the texture data fields are used to define the slot address 1500 uses the texture data attributes of dimensional property 1510, texture resolution 1520, and the data field combination 1530. As discussed above, the dimensional property 1510 can be either 2D 1512 or 3D 1514. Additionally, as discussed above, the texture resolution 1520 is defined as a specific number of bits per element, for example, 32-bits per element 1522. One of ordinary skill in the art will appreciate that a texture resolution of greater than 32 bits per element is contemplated within the scope and spirit of this disclosure and can be accomplished by adding additional corresponding data to the logic in the tables of FIGS. 14 and 15. For example, additional texture resolutions including, but not limited to, 64, 128, and 256 bits per element are also contemplated within the scope and spirit of this disclosure.

The data field combination 1530 is defined by field selection logic such as that found in FIG. 13. Where the data field logic includes multiple data field combinations, such as DV/DU, the texture resolution 1520 is used to determine which data field combination is utilized. Combining the slot data field selection logic of FIG. 13 and the bit determination logic for the slot address of FIG. 15, consider a non-trilinear filter 3D texture data having multiple textures and a texture resolution of 32-bits per element. The logic of FIG. 13 identifies data fields TT, as shown in block 1376, for determining the source of the slot address data. Referring now to FIG. 15, where the 3D property having 32-bits per element under data field TT, as shown in block 1532, yields bit values of 1 and 0 as shown in block 1534. Thus, in this example, the slot address for the incoming texture data will be determined by the values of the bit locations 1 and 0 of the texture identification number.

Continuing with the above-example, reference is made to FIGS. 12 and 14 for determining the set address data location. As shown in FIG. 12, the data fields for 3D texture data are QQ as indicated in block 1230. Referring now to FIG. 14, the block corresponding to 32-bits per element under 3D texture data shows bits 1 and 0 as shown in block 1426. Thus, referring back to FIG. 8, the slot ID and set ID fields will be extracted form the values in the T(1), T(0), Q(1), Q(0) locations of the L2 texture address data.

Figure 16:
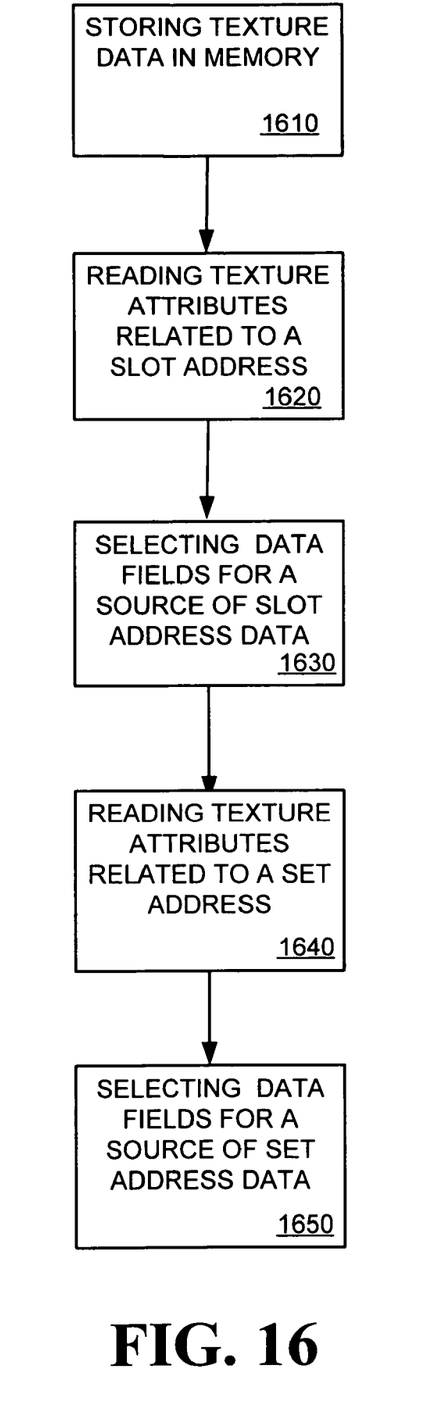
FIG. 16 is a block diagram illustrating an embodiment of a method of performing techniques disclosed herein.

Reference is now made to FIG. 16, which is a block diagram illustrating an embodiment of a method of performing the techniques as disclosed herein. Texture data is stored in memory, typically in the form of texture maps in block 1610. Texture attributes related to a slot address are read in block 1620 and data fields within the texture data are selected as a source of slot address data in block 1630. Texture attributes related to a set address are read in block 1640 and data fields for a source of set address data are selected in block 1650. The order of the blocks shown is only illustrated by way of example and is not intended to limit the scope or spirit of the claims. For example, the functions relating to the slot address as illustrated in blocks 1620 and 1630 can be combined into a single block in alternative embodiments. Similarly, the functions relating to the set address as illustrated in blocks 1640 and 1650 can be combined into a single block in alternative embodiments. Further, one of ordinary skill in the art will appreciate that the order of the slot address block or blocks relative to the set address block or blocks can vary within the scope and spirit of this disclosure.

Figure 17:
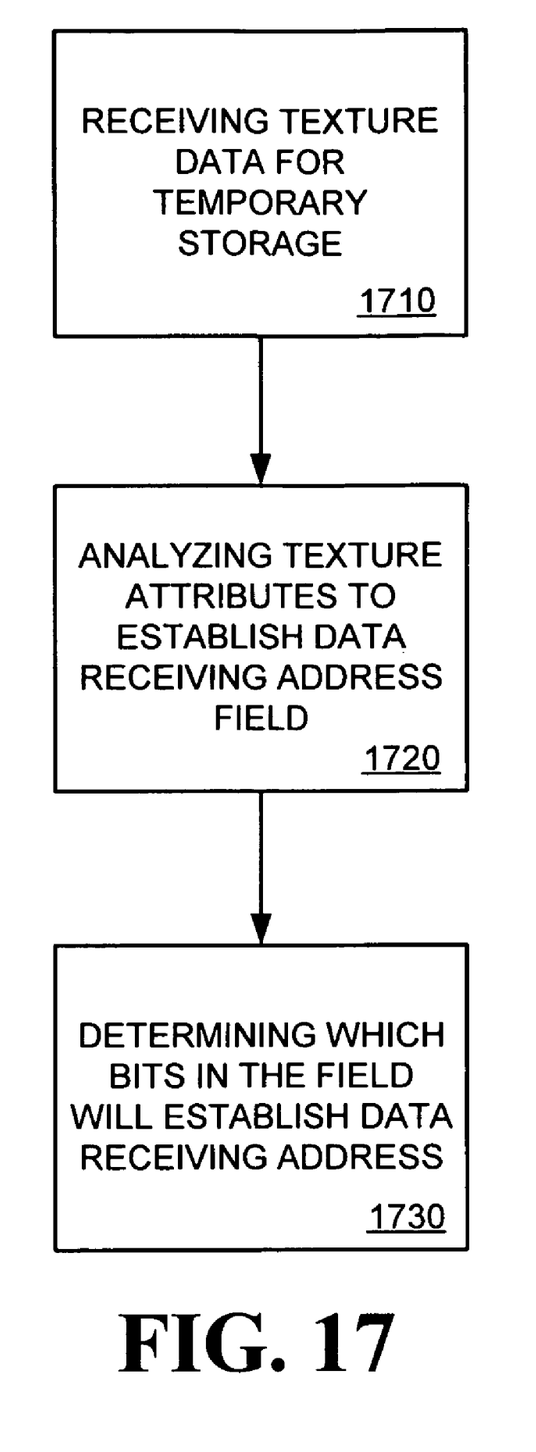
FIG. 17 is a block diagram illustrating an embodiment of a means of performing techniques disclosed herein.

Reference is now made to FIG. 17, which is a block diagram illustrating an embodiment of a means of performing the techniques as disclosed herein. An embodiment under this disclosure may be performed by receiving texture data for temporary storage 1710. The texture data contains texture attributes, which are analyzed to establish a data receiving address field 1720. The texture attributes are further analyzed to determine which bits within the data receiving address fields will determine the actual data receiving address 1730.

Although the concepts herein have been presented in the context of a cache with four slots and four sets per slot, thus using a 2-bit slot address field and a 2-bit set address field, the embodiments disclosed herein are merely exemplary and not intended to limit the scope or spirit of the disclosure. Additionally, although the techniques disclosed herein are discussed in the context of texture data having specific attributes, including filter mode, number of textures, texture data dimension, and texture resolution, one or ordinary skill in the art knows or will know that the techniques herein can be applied using other texture data attributes. Further, the concept of determining a data destination scheme based on the content of the data in applications other than texture data processing is contemplated within the scope and spirit of this disclosure.

The embodiments of the present disclosure can be implemented in hardware, software, firmware, or a combination thereof. In some embodiments, the methods and systems are implemented in software or firmware that is stored in a memory and that is executed by a suitable instruction execution system. If implemented in hardware, as in an alternative embodiment, the methods and systems can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of an embodiment of the present disclosure in which functions may be executed out of order from that shown or discussed, including substantially concurrently or in reverse order, depending on the functionality involved, as would be understood by those reasonably skilled in the art of the present disclosure.

The methods and systems herein, which may comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. In addition, the scope of the present disclosure includes embodying the functionality of embodiments of the present disclosure in logic embodied in hardware or software-configured mediums.

It should be emphasized that the above-described embodiments of the present disclosure, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

The following is claimed:

1. A graphics processing system, comprising:
    a cache that receives texture data from a system memory, such that the texture data is assigned a specific cache location, wherein the cache comprises a plurality of slots, wherein each one of the slots comprises a plurality of sets, and wherein the specific location comprises set data and slot data;
    a plurality of texture attributes comprising a portion of the texture data;
    selection logic configured to determine a plurality of data fields based on the plurality of texture attributes, wherein the selection logic is configured to analyze a plurality of first texture attributes to determine a plurality of slot selection data fields, wherein the selection logic is configured to analyze a plurality of second texture attributes that determine a plurality of set selection fields; and
    a plurality of texture values in the plurality of data fields, the plurality of texture values being utilized to determine the specific cache location.

2. The system of claim 1, wherein one of the plurality of first texture attributes comprises a value corresponding to the number of textures within each texel.

3. The system of claim 1, wherein one of the plurality of first texture attributes comprises a texture type.

4. The system of claim 3, wherein the texture type comprises a filter mode.

5. The system of claim 4, wherein the filter mode is selected from the group comprising: trilinear, bilinear, and box.

6. The system of claim 1, wherein one of the plurality of first texture attributes comprises a texture dimensional property.

7. The system of claim 6, wherein the texture dimensional property is selected from the group comprising: two-dimensional and three-dimensional.

8. The system of claim 1, wherein the plurality of slot selection data fields is selected from the group comprising: a first texel location coordinate, a second texel location coordinate, a texture type, a level of detail bias value, and a texel volume value.

9. The system of claim 8, wherein a specific bit location within each of the plurality of slot selection data fields is determined by the texture type.

10. The system of claim 1, wherein one of the plurality of second texture attributes comprises a texture dimensional property.

11. The system of claim 10, wherein the texture dimensional property is selected from the group comprising: two-dimensional and three-dimensional.

12. The system of claim 9, wherein the specific bit location within each of the plurality of set selection data fields is determined by a texture resolution.

13. The system of claim 12, wherein the texture resolution is expressed as bits per texel.

14. A method for processing texture data in a graphics processor, comprising:
    storing texture data in a memory;
    reading a plurality of first texture attributes from the texture data;
    analyzing the plurality of first texture attributes;
    determining a plurality of first data fields for selecting a source of cache slot address data, such that the plurality of first data fields depend on the plurality of first texture attributes;
    reading a plurality of second texture attributes from the texture data;
    analyzing the plurality of second texture attributes; and
    determining a plurality of second data fields for selecting a source of cache set address data, such that the plurality of second data fields depend on the plurality of second texture attributes.

15. The method of claim 14, wherein one of the plurality of first texture attributes comprises a value representing the number of textures within each texel.

16. The method of claim 14, wherein one of the plurality of first texture attributes comprises a texture type.

17. The method of claim 16, wherein the texture type includes a filter mode.

18. The method of claim 17, wherein the filter mode comprises trilinear filtering.

19. The method of claim 16, wherein the a one of the plurality of first texture attributes comprises a texture dimensional property.

20. The method of claim 19, wherein the texture dimensional property is selected from the group comprising: two-dimensional and three-dimensional.

21. The method of claim 14, wherein the plurality of first data fields is selected from the group comprising: a first texel location coordinate, a second texel location coordinate, a texture type, a level of detail bias value, and a texel volume value.

22. The method of claim 21, wherein a specific bit within each of the plurality of first data fields is determined by the texture type.

23. The method of claim 14, wherein one of the plurality of second texture attributes comprises a texture type.

24. The method of claim 23, wherein the texture type comprises a texture dimensional property.

25. The method of claim 24, wherein the texture dimensional property is selected from the group comprising: two-dimensional and three-dimensional.

26. The method of claim 23, wherein a specific bit within each of the plurality of second data fields is determined by a number of bits per element.

27. A graphics processing apparatus, comprising:
means for receiving texture data, such that the texture data is temporarily stored for processing in a texture filter;
means for analyzing a plurality of texture attributes, corresponding to the texture data, to determine which of the plurality of texture attributes will establish a texture data receiving address; and
means for determining which bit in each of the plurality of texture attributes will establish a texture data receiving address.

* * * * *